United States Patent
Lehto et al.

(10) Patent No.: US 7,467,200 B2
(45) Date of Patent: Dec. 16, 2008

(54) SYSTEM AND METHOD FOR CONTROLLING AN ASSOCIATED NETWORK CONNECTION WITH A MECHANISM OF TERMINATING THE SAME

(75) Inventors: Pekka Lehto, Oulu (FI); Jari T. Kangas, Kempele (FI); Kirsi Rotsten, Espoo (FI); Jari Marjoniemi, Tampere (FI)

(73) Assignee: Nokia Corporation, Espoo (FI)

( * ) Notice: Subject to any disclaimer, the term of this patent is extended or adjusted under 35 U.S.C. 154(b) by 696 days.

(21) Appl. No.: 10/352,186

(22) Filed: Jan. 28, 2003

(65) Prior Publication Data
US 2004/0003092 A1    Jan. 1, 2004

(30) Foreign Application Priority Data
Jan. 31, 2002   (GB)   ................... 0202278.8

(51) Int. Cl.
*H04L 12/56* (2006.01)
*G06F 15/173* (2006.01)
*H04L 12/28* (2006.01)
(52) U.S. Cl. ............... 709/224; 709/229; 370/431; 370/389; 379/221.08
(58) Field of Classification Search ............ None
See application file for complete search history.

(56) References Cited

U.S. PATENT DOCUMENTS

| 7,200,150 B2* | 4/2007 | Lewis ............... 370/401 |
| 2002/0006114 A1 | 1/2002 | Bjelland et al. |
| 2003/0140121 A1* | 7/2003 | Adams ............... 709/219 |
| 2005/0021713 A1* | 1/2005 | Dugan et al. ......... 709/223 |

FOREIGN PATENT DOCUMENTS

| WO | WO 01/78331 A1 | 10/2001 |
| WO | WO-0178331 | * 10/2001 |

OTHER PUBLICATIONS

"Media Gateway for Mobile Networks", Fyrö et al, Ericsson Review, No. 4, 2000, XP-000969929, pp. 216-223.

* cited by examiner

*Primary Examiner*—Wen-Tai Lin
(74) *Attorney, Agent, or Firm*—Squire, Sanders & Dempsey, LLP

(57) ABSTRACT

A system has a first entity and a second entity. The first entity and second entity are arranged to have a control interface therebetween. At least one of said first and second entities is arranged to associate a resource with at least one connection. At least one of said first and second entities has means for checking the status of the connection and to release an associated resource if the connection is terminated.

39 Claims, 5 Drawing Sheets

SW blocks

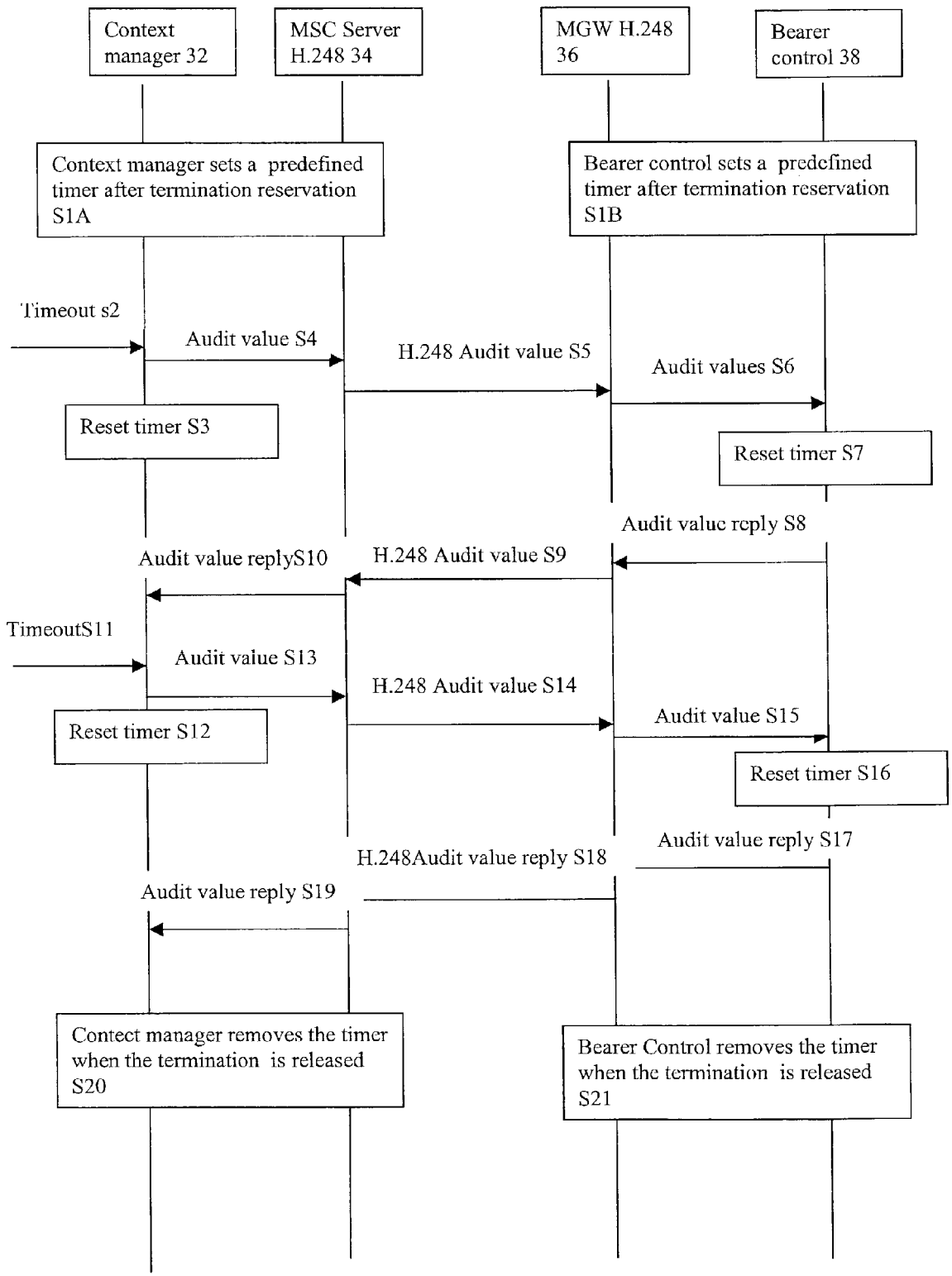
Figure 3: Supervision in OK case

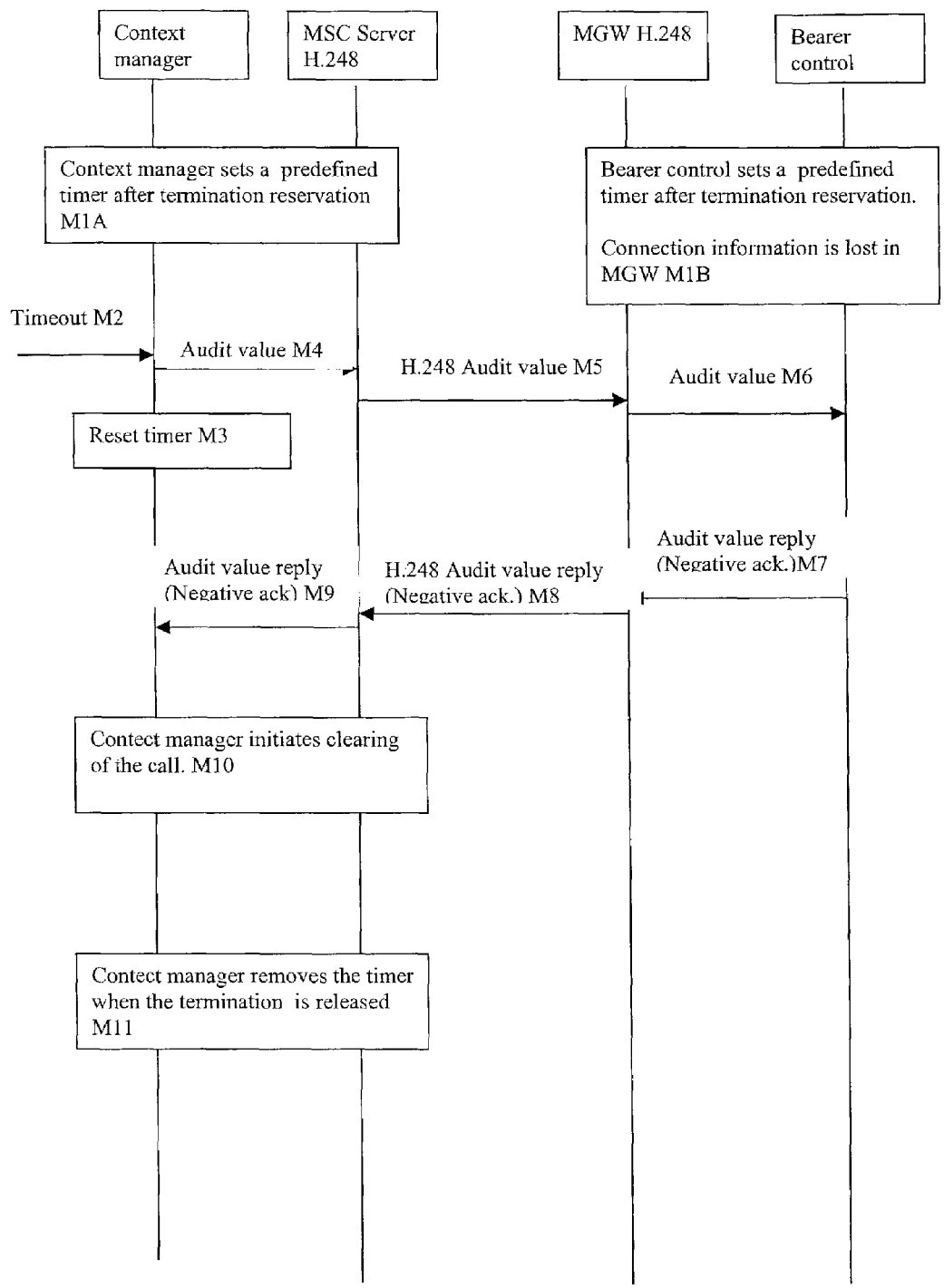
Figure 4: Connection information lost in MGW

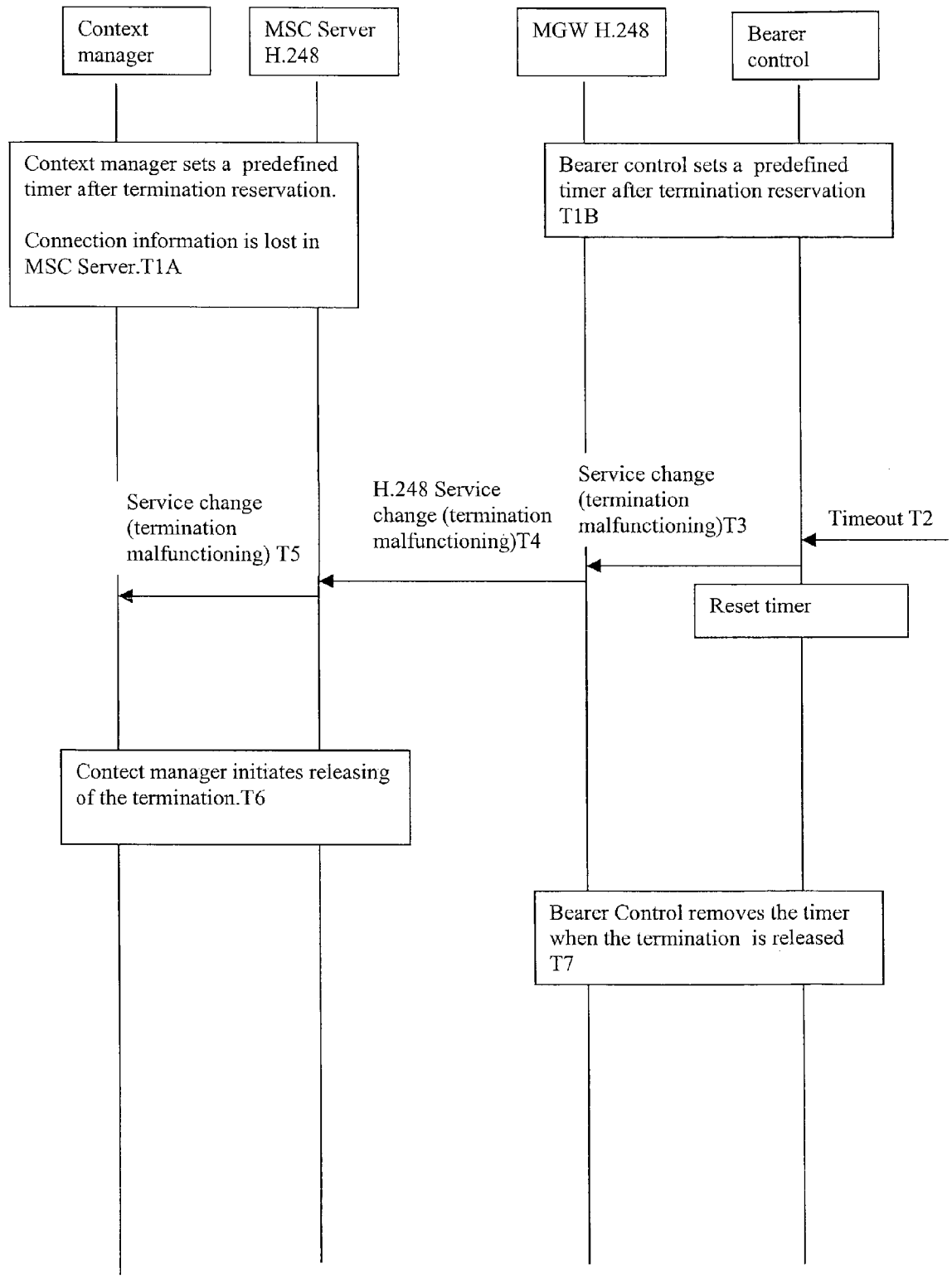
Figure 5: Connection information lost in MSC Server

SYSTEM AND METHOD FOR CONTROLLING AN ASSOCIATED NETWORK CONNECTION WITH A MECHANISM OF TERMINATING THE SAME

FIELD OF THE INVENTION

The present invention relates to a system and in particular but not exclusively to a system for use in a wireless telecommunications network.

BACKGROUND OF THE INVENTION

Wireless cellular telecommunications networks are known. The area covered by the network is divided up into a number of cells each of which has base station. User equipment in the cells are able to communicate with the base stations using radio frequencies. The user equipment can take any suitable format and is often a mobile terminal. The wireless network can be connected to other wireless networks using the same or different standards as well as to wired networks.

A number of different standards have been proposed or are known which govern the communications within the cellular network. GSM (global system for mobile communications) is one such standard which uses a time/frequency division multiple access approach. This is a so called second generation standard. Third generation standards such as UMTS (Universal mobile telecommunications system) and W-CDMA (wideband code division multiple access) are currently being proposed. At least some of these third generation systems propose to use a code division multiple access technique.

In the $3^{rd}$ Generation Partnership Project, Technical Specification Group Services and System Aspects; Architecture Principles for Release 2000, 3G TR 23.821 which is incorporated by reference, a system is described. This system has a media gateway MGW and a MSC server which communicate via an H.248/MEGACO protocol. This is a protocol which has been developed by ITU-T and IETF. H.248 is the ITU-T name for it and MEGACO (media gateway control) is the IETF name for it. In this document it will be referred to as the H.248 protocol. The protocol has been developed for networks where the user plane and the control plane are separated, for example in H.323 servers and gateways. This document describes a system in which there are amongst other entities a media gateway MGW and a mobile services switching centre MSC server. These two entities are directly connected to each with the MGW interfacing with the radio access part of the network and other MGWs, and the MSC server being connected to a number of entities such as the radio access part of the network, a gateway MSC, and various applications and services.

The MGW Is a distributed network element which is used for user plane transmission. The MSC server is a centralised network element. H.248/MEGACO is used as a control protocol between the MGW and the MSC server.

In use both the MGW and the MSC server have to reserve resources. The resources are basically user plane termination points and connections between them. Also some properties related to user plane termination points are also regarded as resources. When a call requires something for the user plane in the media gateway, the MSC server requests resources such as termination points, connections or the like. The MSC server and the MGW have a common understanding of the reserved resources.

However, the inventors have appreciated that the current proposals do not address the difficulties which would be caused in there is a mismatch of resources reserved in the MGW and the MSC server. For example, the resources in one of the entities may be released whilst remaining reserved in the other entity. If this occurs a number of times, resources which are not being used are reserved and cannot be used. This effectively reduces the available capacity of the entity. Clearly this is undesirable.

SUMMARY OF THE INVENTION

It is an aim of embodiments of the present invention to address one or more of the problems discussed above.

According to a first aspect of the present invention there is provided a system comprising: a first entity; a second entity, said first entity and second entity being arranged to have a control interface there between, at least one of said first and second entities being arranged to associate a resource with at least one connection, at least one of said first and second entities having means for checking the status of said connection and to release an associated resource if said connection is terminated.

Preferred embodiments of the present invention may have an MSC server as one entity and a MGW as the other. There may be a control interface between the two entities which may be an H.248 interface. The MGW may have a user plane connection with which the resources may be associated. The checking means of the MSC server and the MGW may check the status of the user plane connection.

According to a second aspect of the present invention, there is provided a method for use in a system comprising a first and a second entity having a control interface therebetween, comprising the steps of: associating a resource with at least one connection; checking the status of the connection at at least one of said first and second entities; and releasing an associated resource if said connection is terminated.

According to a third aspect of the present invention, there is provided an entity comprising: a control interface for interfacing with a further entity; means for associating a resource with at least one connection; means for checking the status of said connection; and means for releasing an associated resource if said connection is terminated.

According to a fourth aspect of the present invention, there is provided an entity comprising: a control interface for interfacing with a further entity; means for associating a resource with at least one connection; means for checking the status of said connection; and means for sending a message relating to the status of said connection to said further entity.

BRIEF DESCRIPTION OF DRAWINGS

For a better understanding of the present invention and as to how the same may be carried into effect, reference will now be made by way of example to the accompanying drawings in which:

FIG. 3 shows a method embodying the present invention where there is no loss of information in the MGW or the MSC server;

FIG. 4 shows a method embodying the present invention where there is loss of information in the MGW; and FIG. 5 shows a method embodying the present invention where there is loss of information in the MSC server.

DETAILED DESCRIPTION OF EMBODIMENTS OF THE PRESENT INVENTION

Figure 1:
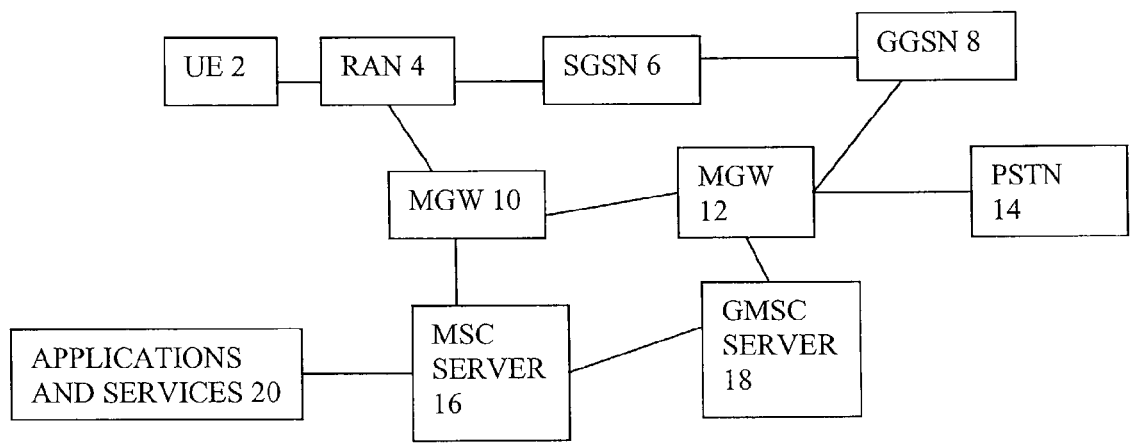
FIG. 1 shows a network embodying the present invention.

Reference will first be made to FIG. 1 which shows a network embodying the present invention. The embodiment of the present invention will be described in the context of a third generation system. However it should be appreciated that embodiments of the present invention can be used with any other suitable communications system including wired or wireless systems.

User equipment 2 is arranged to communicate with a base station which is part of a radio access network RAN 4. The user equipment can take any suitable form and may support packet and/or circuit switched communication. The user equipment can be a mobile telephone, PDA (personal digital assistant), portable computer, combination of these or any other suitable device. The term base station is intended to cover any entity which is capable of direct radio communication with the user equipment. The base station is sometimes referred to a Node B in the third generation standard. However, the term base station is intended to include this Node B as well as any other similar entity, regardless of the standard. The RAN may also include a base station controller or other entity providing a similar function. It should be appreciated that the elements making up the RAN 4 are well known to the person skilled in the art and will not be discussed in any further detail.

The RAN 4 is connected to a support GPRS (General packet radio service) signalling node SGSN 6 which provides support for a packet based service. Embodiments of the present invention can be used in systems which are packet based, circuit switched or both. The SGSN 6 is connected to a gateway GPRS signalling node 8 which acts as a gateway to for example IP based networks which are packet based.

The RAN 4 is also connected to a first MGW 10 which will be described in more detail hereinafter. The first MGW is connected to a MSC server 16 which again will be described in more detail hereinafter.

The MSC server 16 is connected to an application and services provider 20 which provides services or applications. Examples of services and applications are IN (intelligent network) services and charging services. The application and services may be provided by an entity which is external to the network or is part of the network.

The MSC server 16 is also connected to a Gateway MSC (GMSC) server 18 which mainly comprises the call control and mobility control parts for a gateway MSC. The GMSC server and a second MGW 12 together provide the functionality of a GMSC.

The second MGW 12 is connected to the first MGW 10, the GGSN 8 and an external network such as a PSTN (public services telecommunications network.

Figure 2:
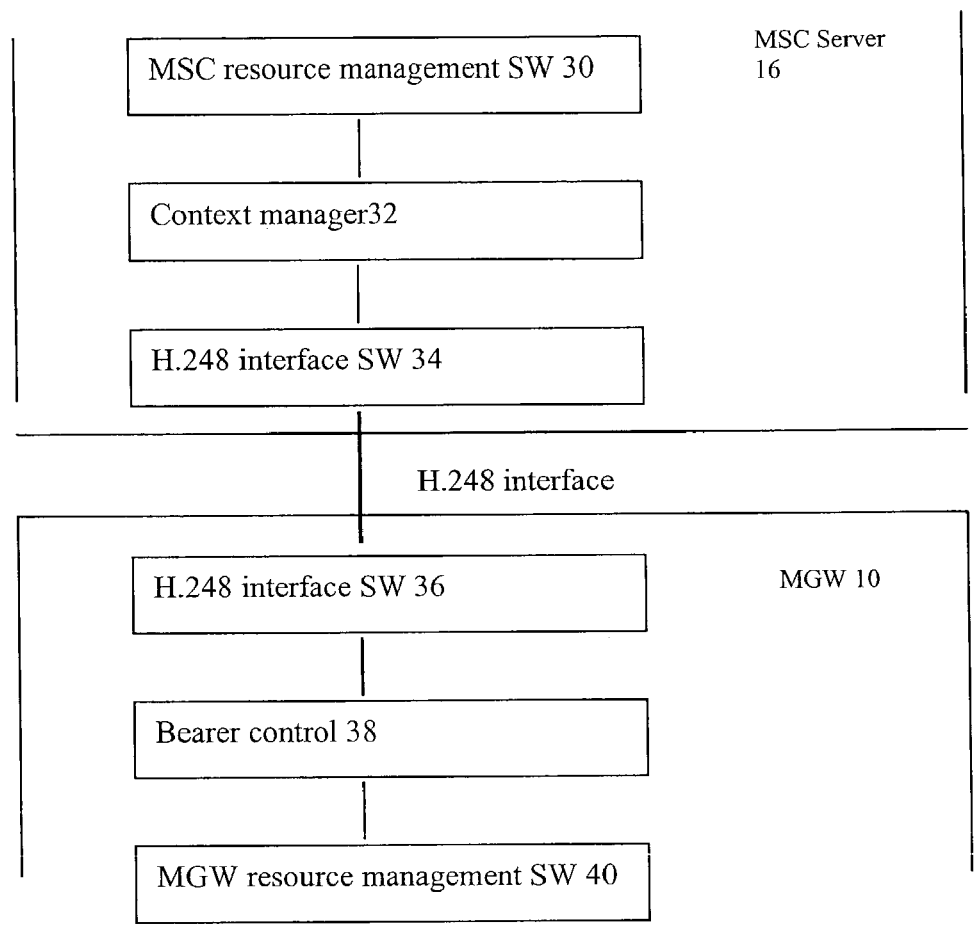
FIG. 2 shows the media gateway and mobile services controller server of FIG. 1 in more detail.

Reference will now be made to FIG. 2 which show the MSC server and MGW in more detail. The media gateway 10 provides a PSTN (public service telephone network)/PLMN (public land mobile network) transport termination point for a defined network and interfaces the UTRAN (UMTS terrestrial radio access network) with the core network via the Iu interface. The MGW may terminate bearer channels from a switched circuit network and media streams from a packet network. Over the Iu connection, the MGW may support media conversion, bearer control and payload processing such as codec, echo canceller, conference bridge or the like in order to support different Iu options for circuit switched services.

The MGW interacts with the MSC server 16 and GMSC server 18 to provide resource control. The MGW may also interact with other entities not shown. The MGW interacts with the MSC server via an interface 36. The interface has H.248 software. This converts an output from a bearer controller 38 into a form in accordance with the H.248 protocol.

The MGW owns and controls resources such as echo cancellers or the like. The MGW may have its own codec and/or transcoding functionality.

The MGW has resource management software 40 which is arranged to reserve user plane resources and make connections when the MSC server requests it to do so via the bearer control 38. The MGW software may also have payload processing capabilities. The connection between the MSC server and the MGW is via the H.248 interfaces. The function of the bearer control be will be described in more detail in relation to FIGS. 3, 4 and 5.

The MSC server 16 comprises the call control and mobility parts of a GSM/UMTS mobile services switching centre. The server is responsible for the control of mobile originated and mobile terminated circuit switched domain calls. It also terminates the user network signalling and translates it into the relevant network signalling. The MSC server also contains a visitor location register VLR to hold the mobile subscriber's service data and CAMEL (customised application for mobile networks enhanced logic) related data. The server controls the part of the call state that pertain to connection control for media channels in a media gateway.

The MSC server has an interface 34, a context manager 32 and MSC resource management software 30. The resource management software controls the allocation and reservation of the resources of the MSC server. The function of the context manager 32 will be described in relation to FIGS. 3 to 5.

Reference is made to FIG. 3. The context manager sets a predefined timer after termination reservation in step S1A. At the same time, shortly before or shortly after this, the MGW H248 interface and the bearer control sets a predefined timer after termination reservation in step S1B. The timer of the MSC server sets a time after which a check is made to see whether or not a reserved resource is still required or whether it can be released. The timer of the MGW sets a time after which a check is made to see if a check has been made by the MSC server. Since both the MGW and the MSC server have timers, the timers can be set to have the same or different times. Preferably the timer of the MGW is set with a slightly longer time. Where the timers have the same time, the MGW timer is preferably set after the timer of the MSC server.

When this period of time set by the context manager 32 expires, the context manager 32 receives a timeout signal from a timer. This is step S2. This causes the context manger 32 to reset the timer in step S3. The context manager 32 generates an audit value which is forwarded to the H.248 interface 34 in step S4. The interface 34 converts the audit value to a H.248 audit value. The converted H.248 value is then forwarded to the H.248 interface 36 of the MGW. This takes place in step S5. It should be appreciated that this audit message is effectively a checking message. This checking message is thus asking whether a particular resource still needs be reserved at the MSC server. The message provides the current values of properties, events, signals and statistics associated with terminations. The message may also include termination identity, the context identity and a descriptor which identifies a more detailed information request. It should be appreciated that embodiments of the present may use different forms for the message including none, some or all of the information described above and optionally with further information.

This message is received by the H.248 interface of the MGW and converted into a format in which it can be understood by the bearer control 38. This message is then sent to the bearer control 38. This takes place in step S6. In step S7, the bearer control resets the timer as a checking signal has been received. In step S8, an audit value reply is generated by the controller and sent to the interface. The audit reply will indicate if the MGW still requires the resources to be reserved in the MSC server. The reply may include the termination ID, the context ID and if any detailed information was requested, that information. The reply may include any error information. Again, in alternative embodiments of the present invention, the reply may include none, some or all of this information and optionally further information.

The interface converts the reply into the H.248 format and sends it to the MSC server. This is in step S9. The message is received by the interface of the MSC server which converts the H.248 message into a format which can be understood by the context manager 32. This message is then sent to the context manager. This is in step S10. If the reply indicates that the resources should be reserved in the MSC server, then the resources will continue to be reserved.

This process is repeated in steps S11 to S19. This is triggered by the ending of the predetermined time period of the timer of the MSC server 16. When the connection is terminated or released in the normal way, in step S20 the context manager stops the timer in the MSC server and in step S21 the bearer controller stops the timer in the MGW. The releasing or termination of the connection causes the resources to be released. The order of steps S21 and S20 are not important as far as embodiments of the present invention are concerned and may occur at more or less the same time.

It should be appreciated that the timing of the resetting of the timer at the MGW and the MSC server is not particularly critical and takes place before, during or after the generation and sending of the audit values.

Reference is made to FIG. 4 which shows how embodiments of the invention work in the scenario that the connection information has been lost in the MGW.

Step M1A is the same as step S1A described in relation to FIG. 3. Step M1B is the same as step S1B of FIG. 3 except that the connection information has been lost in the MGW. This has the effect of switching off the timer in the MGW.

Steps M2 to M6 are the same as steps S2 to S6 of FIG. 3.

Steps M7 to M9 are similar to steps S8 to S10. However the message content differs. In FIG. 4, the audit reply will be a negative reply.

In step M10, the context manager will initiate the clearing of the call, that is the termination of the connection at the MSC server. In step M11, the context manager switches off the timer when the connection has been released.

Reference is made to FIG. 5 which shows how embodiments of the invention work in the scenario that the connection information has been lost in the MSC server.

In step T1A, the context manger and server interface set a predefined timer after a termination reservation. The connection information has however been lost from the MSC server. In practice this means that there are no resources reserved in the MSC server for the connection and the timer is stopped. The bearer controller and the MGW interface in step T1B sets a predefined timer after termination reservation.

After a predetermined time defined by the timer, the bearer control receives a time out signal in step T2. This is because no checking signal from the MSC server has been received. The bearer controller in step T3 generates a message which includes the correct context identity, the termination identity parameters and information identifying the reason for the service change. In this situation, the service change reason would be that the termination is malfunctioning. This request should also indicate the method of the service change. The service change can be done by a graceful or forced method.

1) Graceful—indicates that the specified connection will be taken out of service after a specified service change delay; established connections are not affected, but the media gateway controller should refrain from establishing new connections and should attempt to gracefully tear down existing connections on the termination(s) affected by the service change command. The MGW should set termination service state at the expiry of service change delay or the removal of the termination from an active context (whichever is first), to "out of service".

2) Forced—indicates that the specified terminations were taken abruptly out of service and any established connections associated with them were lost. The media gateway controller is responsible for cleaning up the context (if any) with which the failed termination is associated. At a minimum the termination shall be subtracted from the context. The termination service state should be "out of service".

In step T4, the message is converted by the MGW interface into an H.248 message and transmitted to the interface of the MSC server. The interface of the MSC server converts the message into a form in which it can be understood by the context manager and forwards that converted message to the context manager. This takes place in step T5.

In step T6, the context manager in response to the message initiates the release of the connection. This causes the connection to be released at the MSC (insofar as there is any connection) and also at the MGW. When the connection has been released, the bearer control stops the timer in the MGW. This takes place in step T7.

In embodiments of the present invention, a timer may be associated with each resource reserved. The audit values may then be generated for a particular resource and sent on an individual basis. Alternatively, a single timer may be used for two or more or even all the resources. The audit message would then request a reply for all of the resources which have been reserved or are in use.

In preferred embodiments of the present invention, if no reply is received to an audit request, this is treated in the same way as a negative reply to the audit request.

In alternative embodiments of the present invention, the timer in the MGW could be used to trigger audit requests which are sent to the MSC server. In an alternative embodiment, the MGW timer could be arranged to provide audit requests and the timer of the MSC server would provide a time out signal if no audit signal is received from the MGW.

The timer can be set to an suitable value and may for example be 10 minutes. Of course the timer can be set to a shorter or a longer period. The timer can be selected based on the type of connection or the type of information provided by a connection. The timer can also be set based on the quality of service for which a user has subscribed or which is available to the user. The timer can also be set so as to take into account the volume of traffic or quality of traffic.

In preferred embodiments of the present invention, the interfaces of the server and the MGW have been described as being H.248 interfaces. It should be appreciated that in alternative embodiments of the invention the interfaces can operate in accordance with any other suitable protocol. It is preferred but not essential that the interfaces use the same protocol.

Preferred embodiments have been described in the context of a MGW and a MSC server. It should be appreciated that alternative embodiments of the present invention may be used with entities other than the described entities. For example embodiments of the present invention may be used with H.323 servers and gateways or the like.

The MSC server and the MGW are directly connected to each other. It should be appreciated that embodiments of the present invention can also be used with entities which are not directly connected to each other and/or which communicate via one or more other entities.

The MSC server and MGW are described as each reserving resources. However it should be appreciated that embodiments of the present invention may be used where only one of the entities reserves resources. Where both entities reserve resources, only one of the entities may have a timer and carry out the audit requesting a reply from the other entity. Where only one of the entities has a timer, the entity having the timer may carry out the audit on itself.

Embodiments of the present invention have been described in the context of a wireless communications network. However it should be appreciated that embodiments of the present invention can also be used in wired networks,

The invention claimed is:

1. A system for controlling a network connection between two entities, comprising:
   a first entity;
   a second entity, said first entity and second entity being configured to have a control interface there between, at least one of said first entity or said second entity being configured to associate a resource with a connection, both of said first entity and said second entity having a checker configured to check the status of said connection wherein said checker of one of said first entity or second entity is configured to send a message to the other of said first entity or second entity requesting status information and to release the associated resource when said connection is terminated;
   wherein said checker in said other of said first entity or second entity is configured to cause termination of said connection when a status information request message is not received within a predetermined time, by sending a further message to said one of said first entity or second entity and in response to said further message said one of said first entity or second entity terminates said connection.

2. The system as claimed in claim 1, wherein said checker of at least one of said first entity or said second entity is configured to check the status of said connection at predetermined time intervals.

3. The system as claimed in claim 1, wherein said checker comprises a timer.

4. The system as claimed in 1, wherein said other of said first entity or said second entity is configured to send a response message to said request.

5. The system as claimed in claim 1, wherein said checker in the other of said first entity or said second entity is configured to reset a timer in response to receipt of a status request.

6. The system as claimed in claim 4, wherein said one entity is configured to receive said response message and in dependence on said response message to maintain said connection or to terminate said connection.

7. The system as claimed in claim 1, wherein when the connection is terminated, the timer of at least one of said first entity or said second entity is turned off.

8. The system as claimed in claim 1, wherein one of said first entity or said second entity is a media gateway.

9. The system as claimed in claim 8, wherein said media gateway comprises a bearer control.

10. The system as claimed in claim 1, wherein one of said first entity or said second entity is a mobile services switching center server.

11. The system as claimed in claim 10, wherein said mobile services switching center comprises a context manager.

12. The system as claimed in claim 1, wherein at least one of said first entity or said second entity has an interface for communicating with the other.

13. The system as claimed in claim 12, wherein said interface is a H.248 interface.

14. The system as claimed claim 1, wherein at least one of said first entity or said second entity comprises a resource manager.

15. The system as claimed in claim 14, wherein said resource manager comprises software.

16. The system as claimed in claim 1, wherein said checker is configured to check at predetermined time intervals.

17. An apparatus for controlling an associated network connection, comprising:
   a control interface configured to interface with a further entity;
   an associator configured to associate a resource with said connection;
   a sender configured to transmit a status information request message to said further entity;
   a checker configured to check the status of said connection, wherein said checker is configured to receive a termination message from said further entity; and
   a releaser configured to release an associated resource when said connection is terminated;
   wherein said termination message is configured to cause termination of said connection, said termination message sent by said further entity when said status information request message is not received by said further entity within a predetermined time.

18. The apparatus of claim 17, wherein said apparatus is a media gateway.

19. The apparatus of claim 17, wherein said apparatus is a mobile switching center server.

20. The apparatus of claim 17, wherein said interface is an H.248 interface.

21. The apparatus of claim 17, wherein said checker comprises a timer.

22. The apparatus of claim 21, wherein the apparatus is configured to make a check on the status of said connection at the end of time set by said timer.

23. The apparatus of claim 21, wherein said timer is configured to be reset when a predetermined signal is received from said further entity.

24. The apparatus of claim 17, wherein said checker comprises a bearer controller.

25. The apparatus of claim 17, wherein said checker comprises a context manager.

26. The apparatus of claim 17, wherein said checker is configured to send a message via said interface to said further entity requesting status information.

27. The apparatus of claim 26, wherein said checker is configured to receive a reply from said further entity via said interface.

28. An apparatus for controlling an associated network connection, comprising:
   a control interface configured to interface with a further entity;
   an associator configured to associate a resource with said connection;
   a checker configured to check the status of said connection; and a sender configured to send a termination message to said further entity to indicate said further entity to terminate said connection;
wherein said checker is configured to initiate termination of said connection when an anticipated status information request message is not received from said further entity within a predetermined time, wherein to initiate termination of said connection said sender is configured to send said termination message to said further entity, and wherein said further entity is configured to terminate said connection in response to said termination message.

29. A method for controlling a network connection between two entities, comprising:
associating a resource with said connection in a system comprising a first entity and a second entity with a control interface therebetween;
checking the status of the connection at at least one of said first entity or said second entity; and
releasing said associated resource when said connection is terminated;
wherein said checking comprises:
checking if an anticipated status information request message is received by said at least one of said first entity and second entity within a predetermined time and sending, in dependence of not receiving said status information request message within said predetermined time, a termination message from said at least one of said first entity and second entity to other of said first entity and second entity wherein the other of said first entity and second entity terminates said connection in response to said termination message.

30. The method as claimed in claim 29, wherein said checking comprises
sending a message from a first one of said first entity or said second entity to the second requesting status information.

31. The method as claimed in claim 29, wherein said checking comprises
setting a timer in at least one of said first entity or said second entity.

32. The method as claimed in claim 31, further comprising:
sending a message from a first one of said first entity or said second entity to the second requesting status information after a predetermined time defined by said timer.

33. The method as claimed in claim 32, further comprising: resetting said timer when said message is sent.

34. The method as claimed in claim 31, further comprising:
when a status information request message is not received by said second entity in a predetermined timer period defined by said timer, sending, by the second entity, a status message to said first entity.

35. The method as claimed in claim 34, further comprising: releasing associated resources by said status message from said first entity.

36. The method as claimed in claim 30, further comprising:
when said message is received by said second entity in a predetermined time period defined by a timer in at least one of said first entity or said second entity, sending, by the second entity, a reply.

37. The method as claimed in claim 34, further comprising: when a reply or status message is sent, resetting said timer.

38. An apparatus for controlling an associated network connection, comprising:
control interface means for interfacing with a further entity connected to the connection;
association means for associating a resource with said connection;
checker means for checking the status of said connection by sending a status information request message to said further entity, wherein said checker means is configured for receiving a message from said further entity; and
releaser means for releasing the associated resource when said connection is terminated wherein said message is configured for causing termination of said connection, said message sent by said further entity when said status information request message is not received by said further entity within a predetermined time.

39. An apparatus for controlling an associated network connection, comprising:
control interface means for interfacing with a further entity connected to said connection;
association means for associating a resource with a connection;
checker means for checking the status of said connection; and
sender means for sending a termination message to said further entity to indicate said further entity to terminate said connection; wherein said checker means is configured for initiating termination of said connection when an anticipated status information request message is not received from said further entity within a predetermined time, wherein to initiate termination of said connection said sender means sends said termination message to said further entity, wherein said further entity is configured to terminate said connection in response to said termination message.

* * * * *